(12) United States Patent
Choi

(10) Patent No.: US 6,665,416 B1
(45) Date of Patent: Dec. 16, 2003

(54) SPEAKER WITH BUILT-IN DIRECT CURRENT MOTOR

(75) Inventor: Ki Jung Choi, Seoul (KR)

(73) Assignees: Sambu Communics Co., Ltd., Incheon (KR); Ju Youn Kim, Seoul (KR)

(*) Notice: Subject to any disclaimer, the term of this patent is extended or adjusted under 35 U.S.C. 154(b) by 0 days.

(21) Appl. No.: 10/290,413

(22) Filed: Nov. 6, 2002

(30) Foreign Application Priority Data

May 21, 2002 (KR) ......................................... 2002-15409

(51) Int. Cl.⁷ ............................................... H04R 25/00
(52) U.S. Cl. ....................................... 381/412; 381/418
(58) Field of Search ................................ 381/396, 412, 381/417, 418, 419, 420, 421, 411, 401

(56) References Cited

U.S. PATENT DOCUMENTS

2002/0097890 A1 * 7/2002 Kobayashi et al.

* cited by examiner

*Primary Examiner*—Sinh Tran
(74) *Attorney, Agent, or Firm*—Weiner & Burt, P.C.; Irving M. Weiner; Pamela S. Burt

(57) ABSTRACT

Disclosed is a speaker with a built-in direct current motor for selectively generating sound and vibration, which includes: a speaker part, a direct current motor part, and a frame. The speaker part has a yoke having a hole formed at the center thereof, a first ring-shaped magnet mounted on the top surface of the peripheral portion of the yoke, a ring-shaped upper plate mounted on the top surface of the first magnet, a vibration plate fixedly mounted to the top surface of the upper plate at the circumferential end thereof, and a generally cylindrical voice coil attached to the bottom surface of the vibration plate. The direct current motor part has a lower plate coupled to the bottom surface of the peripheral portion of the yoke, a flexible printed circuit board disposed on the lower plate, a second ring-shaped magnet mounted on the top surface of the lower plate, a rotary shaft positioned one end thereof on the hole of the yoke and positioned the other end thereof on the hole of the center of the flexible printed circuit board, and an eccentric rotor rotatably mounted on the rotary shaft. According to the present invention, sound or/and vibration is/are selectively outputted from portable equipment such as a cellular phone requiring a vibration functions

3 Claims, 4 Drawing Sheets

SPEAKER WITH BUILT-IN DIRECT CURRENT MOTOR

BACKGROUND OF THE INVENTION

1. Field of the Invention

The present invention relates to a speaker with a built-in direct current (DC) motor, and more particularly, to a speaker with a built-in direct current (DC) motor that is provided in portable equipment such as a cellular phone generating vibration, thereby selectively outputting sound and/or vibration.

2. Background of the Related Art

FIG. 1 is a partial view illustrating a cellular phone with a conventionally used micro speaker and a coin type vibration motor embedded therein.

Recently, consumers desire to purchase a cellular phone that has the functions of producing at least 16-chord or 40-chord polyphonic ring tone and displaying colors. This needs a micro speaker having a range of 17 Phi or more. Since the micro speaker and a vibration motor are separately made for use in conventional cellular phones, however, they should be provided individually in the interior of the cellular phone. As shown in FIG. 1, a cellular phone 3, which has basic specifications of black and white LCD and 16-chord or less sound output, needs a substantially large area for installing a vibration motor 2 and a micro speaker 1 therein. Also, in order to add the functions of providing the micro speaker with a range of 17 Phi or more and displaying colors, there is a need for ensuring a relatively large area within the cellular phone 3.

To solve this problem, there has been provided a micro speaker itself having a vibration function by Korea and Japan in recent years.

The configuration of the conventional vibration speaker will be described in detail hereinafter with reference to FIG. 2.

FIG. 2 is a sectional view of the conventionally used vibration speaker.

Referring to FIG. 2, a lower plate 10 is provided with an air hole 11 from which a sound is generated, in the center thereof and with a vibration plate 12 that is spaced apart by a predetermined distance therefrom on the upper portion thereof in such a manner as to be vibrated by means of a plurality of first elastic support parts 14. The vibration plate 12 is provided with a pair of coils 13 facing with each other on the upper portion thereof, each of which is in the shape of a generally semi-arc. There is also provided an upper case 15 for covering the upper portion of the lower plate 10. The upper case 15 is provided with a magnet 16 that is disposed on the bottom surface thereof to correspond to the pair of coils 13 in such a manner as to cover the pair of coils 13. And, the upper case 15 is disposed on the upper portion of the lower plate 10 in such a manner as to be able to be vibrated by means of a plurality of second support parts 17.

A reference numeral 18 denotes a generally flexible cover that is adapted to connect the outer peripheries between the lower plate 10 and the upper case 15, such that it prevents foreign materials from entering a space between the lower plate 10 and the upper case 15.

In operation, when an alternating current (AC) having a low frequency is applied to the pair of coils 13, the polarities of the coils 13 and the magnet 16 disposed on the bottom surface of the upper case 15 are in turn opposite to each other, such that the upper case 15 and the magnet 16 are in a seesaw situation (the left and right parts on the drawing move up and down) relative to the center of the magnet 16 on which the two polarities meet, thereby making it possible to generate vibration.

However, the above-mentioned vibration speaker has the following problems: first, the alternating current of the low frequency corresponding to the resonance frequencies of the first and second elastic support parts 14 and 17 should be applied to said vibration speaker; and second, the elastic modulus of the first and second elastic support parts 14 and 17 are varied over time, such that the frequency of the alternating current applied has should be appropriately varied. That is to say, the first and second elastic support parts that are vibrated when the alternating current having a frequency of about 147 Hz is applied to the pair of coils 13, but as a predetermined period of time passes, they may not be vibrated due to the variation in their elastic modulus. Therefore, there is a need for a driving part for use in the vibration speaker that expects the variation of the elastic modulus with the lapse of time to convert the initially applied alternating current into the alternating current having a frequency corresponding to the expected elastic modulus variation.

SUMMARY OF THE INVENTION

Accordingly, the present invention is directed to a speaker with a built-in DC motor that substantially obviates one or more problems due to limitations and disadvantages of the related art.

An object of the present invention is to provide a speaker with a built-in DC motor that has a coin type DC motor embedded in a micro speaker for generating vibration therein, thereby selectively generating sound and vibration.

Another object of the present invention is to provide a speaker with a built-in DC motor that is capable of achieving the miniaturization of portable equipment having a micro speaker by decreasing the space in the portable equipment occupied by a conventional micro speaker and coin type vibration motor.

Another object of the present invention is to provide a speaker with a built-in DC motor that is capable of maintaining its initial performance for a relatively long period of time, without having an additional driving part.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an aspect of the present invention, there is provided a speaker with a built-in direct current (DC) motor embedded therein for selectively generating sound and vibration, the speaker comprising: a speaker part including; a yoke having a hole formed at the center thereof, a first ring-shaped magnet mounted on the top surface of a peripheral portion of said yoke in such a manner as to be positioned coaxially with the center axis of said yoke, a ring-shaped upper plate mounted on the top surface of said first magnet in such a manner as to be positioned coaxially with the center axis of said yoke, and adapted to form a magnetic gap between a bent portion of said yoke and said upper plate to thereby constitute a magnetic circuit for generating magnetic flux together with the yoke and the first ring-shaped magnet, a vibration plate attached to the top surface of said upper plate at the circumferential end thereof in such a manner as to be positioned coaxially with the center axis of said yoke, and a generally cylindrical voice coil attached to the bottom surface of said vibration plate and inserted into said magnetic gap, a direct current motor part including; a first lower plate fixedly attached to the bottom surface of said peripheral portion of said yoke, a flexible printed circuit board disposed on said first lower plate, and having a hole formed at the center thereof and a brush transmitting a driving signal, a second ring-shaped magnet mounted on the top surface of said first lower plate in such a manner as to be positioned coaxially with the center axis of said yoke, a rotary shaft fitted at one end thereof into said hole of said yoke and fitted at the other end thereof into said hole of the center of said flexible printed circuit board, and an eccentric rotor rotatably mounted on said rotary shaft and adapted to rotate in response to the driving signal generated from said brush; and a frame adapted to support said speaker part and said direct current motor part.

Preferably, the frame may have a flexible printed circuit board mounted on one side thereof, the flexible printed circuit board having a power feed terminal electrically connected to the voice coil and the brush connected to the eccentric rotor, respectively, and adapted to supply a driving signal to the voice coil to generate sound and a driving signal to the brush to generate vibration due to the rotation of said eccentric rotor.

Preferably, the direct current (DC) motor further includes a motor's upper case which has a hole at the center of an inner surface thereof and contains said rotary shaft having an one end thereof fitted into said hole, said rotor and said second magnet; and a motor's lower case which is connected to the bottom of said upper case and has said second magnet thereon, such that said direct current motor is placed in a space defined by the bottom surface and the inner lateral walls of the central portion of said yoke and the top surface of said lower plate.

BRIEF DESCRIPTION OF THE DRAWINGS

The above and other objects, features and advantages of the present invention will be apparent from the following detail description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
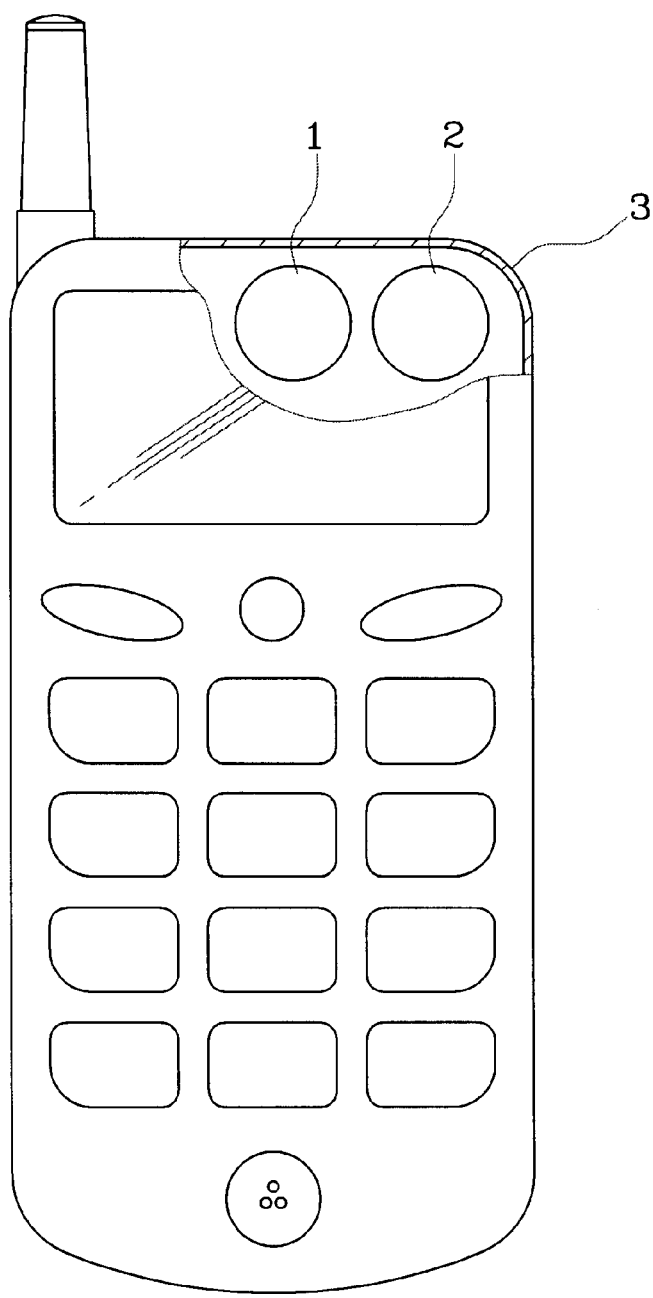
FIG. 1 is a partly cut view illustrating a cellular phone with a conventional micro speaker and a coin type vibration motor embedded therein.
Figure 2:
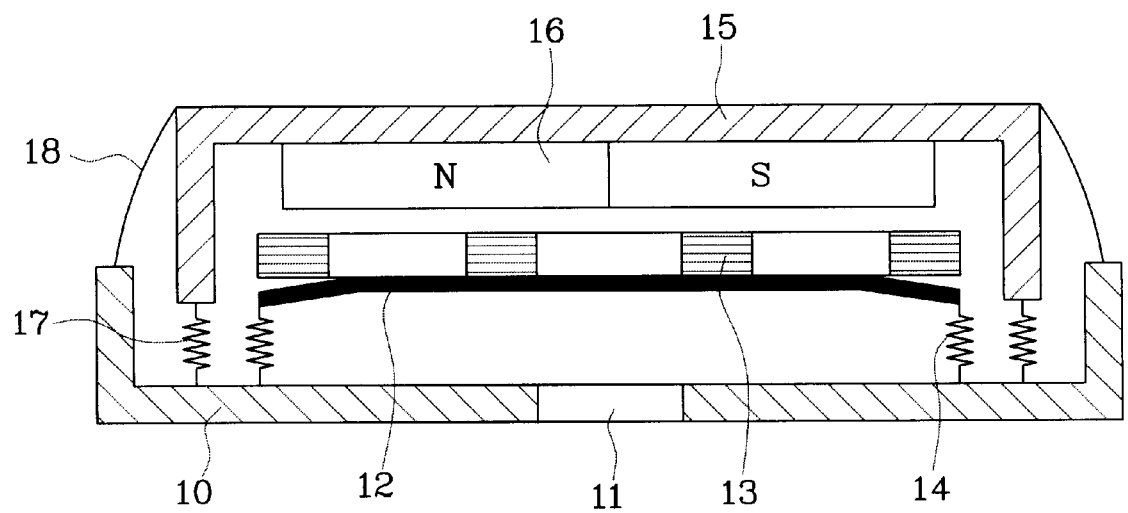
FIG. 2 is a cross sectional view of a conventional vibration speaker.
Figure 3:
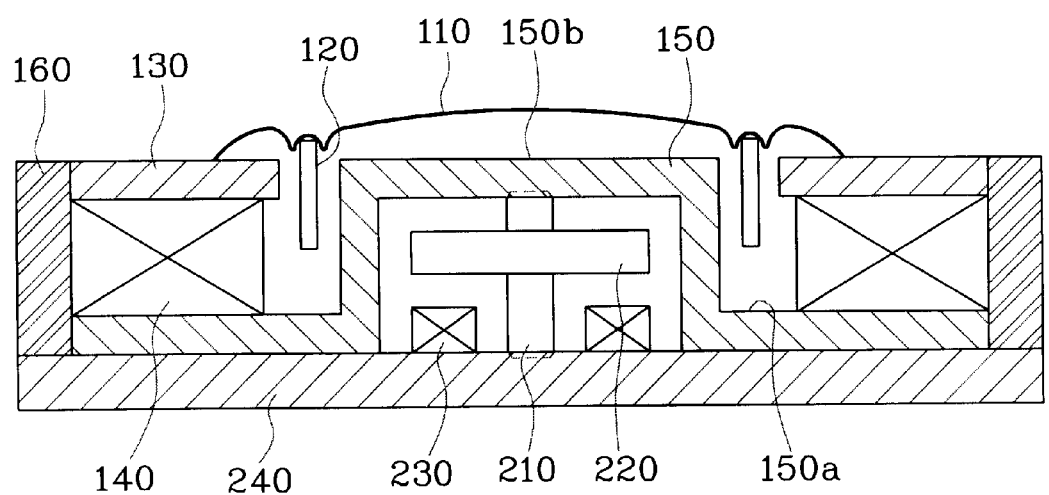
FIG. 3 is a sectional view illustrating a speaker with a built-in DC motor according to a first embodiment of the present invention.
Figure 4:
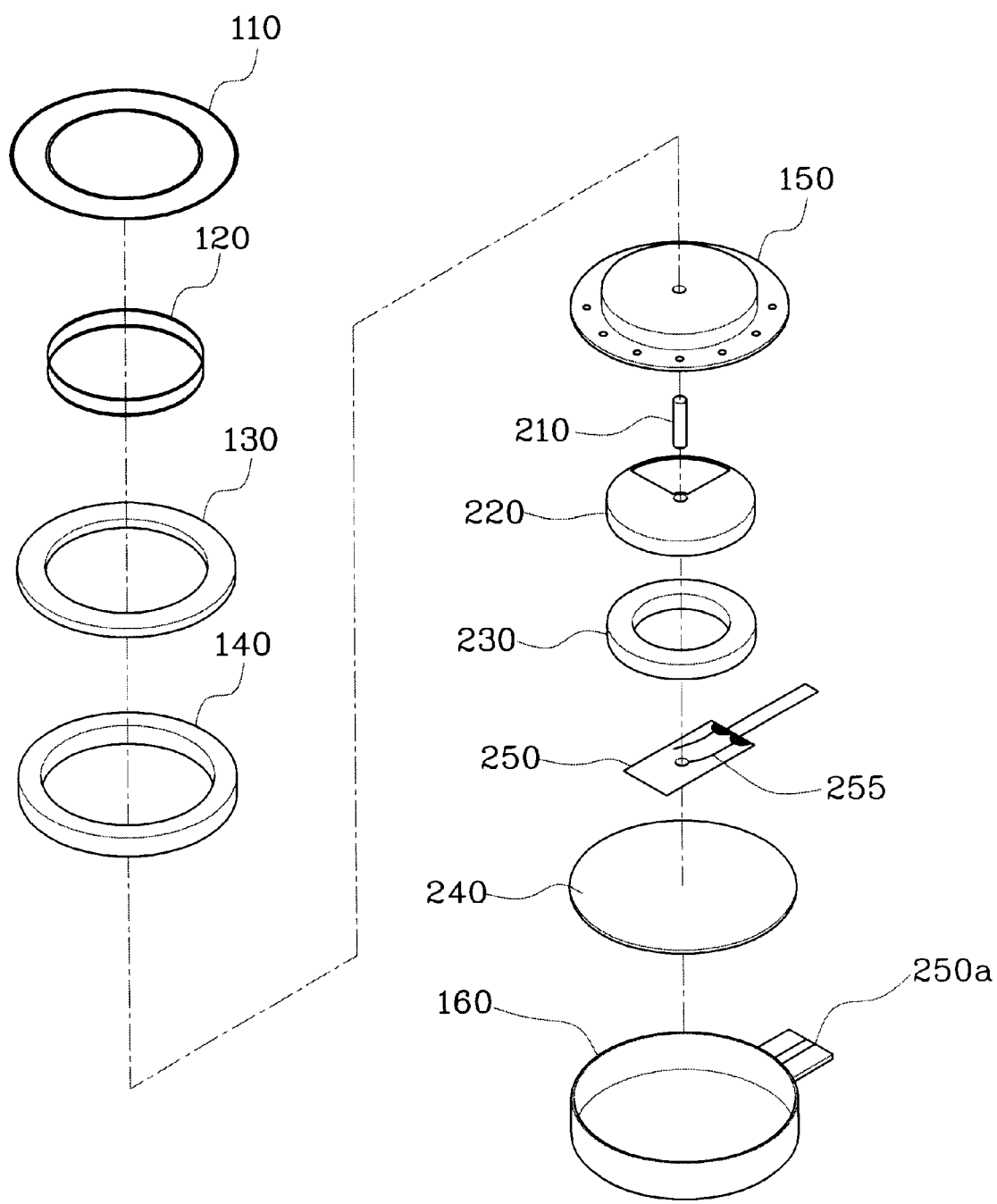
FIG. 4 is an exploded perspective view illustrating the speaker in FIG. 3.

FIG. 3 is a sectional view illustrating a speaker with a built-in DC motor according to a first embodiment of the present invention, and FIG. 4 is an exploded perspective view illustrating the speaker in FIG. 3.

Referring to FIGS. 3 and 4, the speaker with the built-in DC motor according to the first embodiment of the present invention includes a speaker part and a direct current (DC) motor part.

First, for the configuration of the speaker part, a first ring-shaped magnet 140 is mounted on the top surface of the peripheral portion 150a of a yoke 150, and a ring-shaped upper plate 130 is mounted on the top surface of the first magnet 140 such that a magnetic gap is formed between a bent portion of the yoke 150 and the upper plate 130. In this case, the first magnet 140 and the upper plate 130 are bonded to each other by different types of bonding materials that have been diluted, such that the yoke 150, the first magnet 140 and the upper plate 130 are laminated in the order thereof. At this time, the yoke 150 has a hole formed at on the center of the bottom surface of the central portion 150b thereof to receive one end of a rotary shaft 210.

The height of the yoke 150 preferably is the same as that of the upper plate 130 bonded to the first magnet 140, which enables the magnetic gap to be effectively formed. A voice coil 120, which is attached to the bottom surface of a vibration plate 110 fixed at the circumferential end thereof to the upper plate 130, is inserted into the magnetic gap formed between the yoke 150 and the first magnet 140. In more detail, the upper plate 130, the first magnet 140 and the yoke 150 constitute a magnetic circuit, and the voice coil 120 is inserted into the magnetic gap formed in the magnetic circuit.

Also, an upper case (not shown in the drawing), which serves to protect the vibration plate 110 and forms a plurality of sound holes through which the sound generated by the upward and downward vibration of the vibration plate 110 is outputted to the outside, may be fixed to the outer circumferential surface of the upper plate 130 or a frame 160.

The voice coil 120 which receives a driving signal from portable equipment forms an alternating current rotary magnetic field. As a result, there is generated a force acting upward and downward between the voice coil 120 and the magnetic circuit. Consequently, the vibration plate 110 fixed to one end of the voice coil 120 becomes vibrated upward and downward, thereby generating a dilatational wave which, in turn, produces sounds.

Next, for the DC motor part, a rotary shaft 210 is disposed in the lower space of the central portion 150b of the yoke 150, i.e., at the inner center of the reentrant portion of the yoke 150. The rotary shaft 210 is fitted at one end thereof into the hole formed at the center of the central portion 150b of the yoke 150, and fitted mechanically at the other end thereof into the hole formed on a flexible printed circuit board 250 mounted on a lower plate 240. In this case, a second magnet 230 and the lower plate 240 may be bonded to each other by a bonding material that has been diluted or by a coupling member such as a bolt.

The rotary shaft 210 is disposed vertically at the center of the rotor 220 such that the rotor 220 is rotatable. In this case, the rotor 220 is an eccentric rotor that has different masses between its left and right sides relative to its center. When the eccentric rotor 220 rotates by its eccentricity, it generates vibration. The eccentric rotor 220 is manufactured in such a fashion that a plurality of bundles of coils are disposed, in a unsymmetrical manner with respect to the rotary shaft 210, on the upper portion of the printed circuit board with copper foils formed on the both surfaces thereof. The copper foil on the bottom surface of the printed circuit board serves as a rectifier and receives a driving current from a brush 255.

A second ring-shaped magnet 230 is mounted on the top surface of the lower plate 240 in such a manner as to be positioned coaxially with the center axis of the rotary shaft 210 and spaced apart by a predetermined distance from the rotor 220. Also, a flexible printed circuit board 250 is disposed on the lower plate 240, for receiving a driving current from the portable equipment and supplying the received driving current to the coils of the rotor 220. The flexible printed circuit board 250 has the brush 255 mounted thereon, which comes in contact with the rectifier disposed on the lower portion of the rotor 220 to supply the driving current to the coils positioned at the upper portion of the rotor 220.

The frame 160 is formed on the outer circumferential surfaces of the upper plate 130, the first magnet 140, the yoke 150, and the peripheral portion of the top surface of the lower plate 240 by using an injected material made of a non-magnetic plastic resin. The frame 160 may be formed on the peripheral portion of the top surface of the lower plate 240, and preferably, has a protrusion formed vertically at the upper and lower portions thereof, respectively, in such a manner as to support the upper portion of the upper plate 130 and the lower portion of the lower plate 240. The non-magnetic plastic resin is injected under the pressure in a range of 65 to 75 kg/cm$^2$ at a temperature in the range of 220 to 240° C., thereby forming the frame 160.

The front end of the one side of the frame 160 is soldered in such a manner as to be electrically connected to the voice coil 120 and the brush 255 and is then connected to a flexible printed circuit board 250a to which driving signals for driving the voice coil 120 and the brush 255 are applied. In more detail, the flexible printed circuit board 250a has a power feed terminal mounted thereon which is electrically connected to the voice coil 120 and has a power feed terminal mounted therebelow which is electrically connected to the rotor 220, i.e., the brush 255, such that it supplies the driving signals to the voice coil 120 and the rotor 220.

The driving signal applied to the voice coil 120 through the power feed terminal of the flexible printed circuit board 250a corresponds to a sound signal like a bell sound for informing a user of an incoming call, and the driving signal applied to the rotor 220 through the power feed terminal of the flexible printed circuit board 250a corresponds to a direct current (DC) for generating vibration. In case of folder type portable equipment, on the other hand, the speaker with the built-in DC motor according to the present invention is installed an the folder part, such that it can be used as a receiver. In this case, the driving signal applied to the power feed terminal of the voice coil is the speech signal of a calling party.

The speaker with the built-in DC motor according to the first embodiment of the present invention as constructed above installs the DC motor in a reentrant portion that has been not used in the external magnet type speaker having an outer diameter of 17 phi or more, thus not to cause any increase in the whole space thereof.

Figure 5:
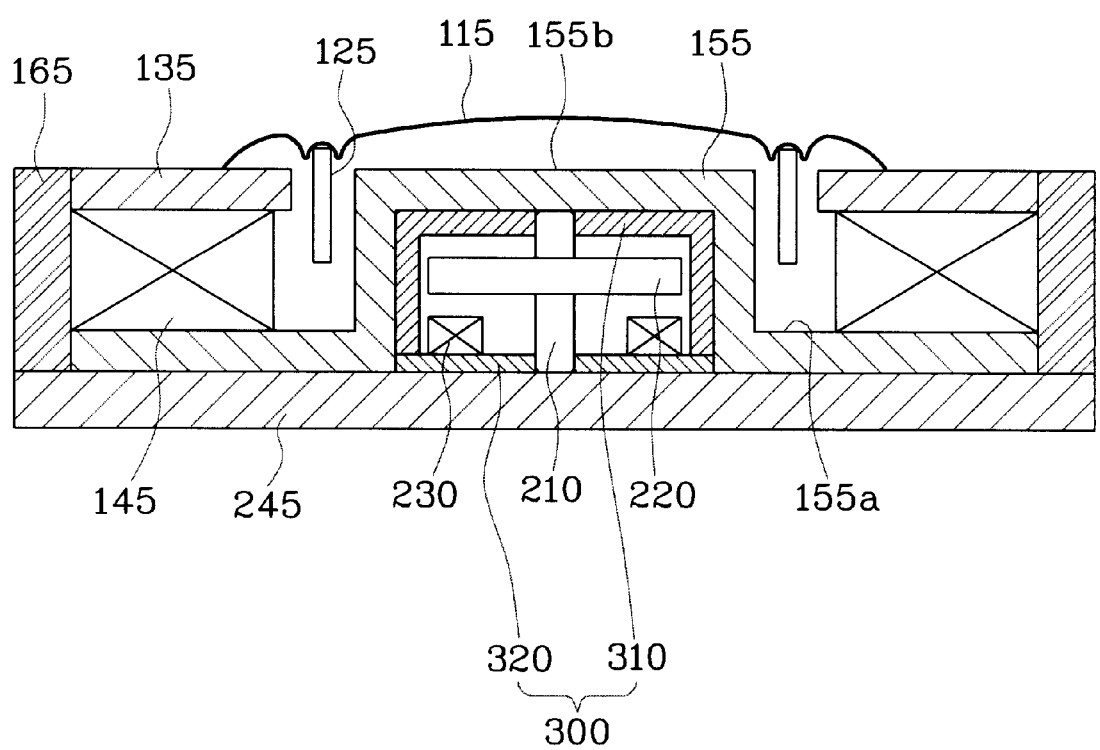
FIG. 5 is a sectional view illustrating a speaker with a built-in DC motor according to a second embodiment of the present invention.

FIG. 5 is a cross sectional view illustrating a speaker with a built-in DC motor according to a second embodiment of the present invention.

Referring to FIG. 5, the speaker with the built-in DC motor according to the second embodiment of the present invention is configured such that a DC motor is coupled to an external magnet type speaker. More particularly, in the speaker with the built-in DC motor, the DC motor is disposed in the interior of the reentrant portion that has been not used in the external magnet type speaker, whereby it functions as a typically used speaker as well as a vibration generator, without any increase in the volume thereof.

In the configuration of the external magnet type speaker, first, a first ring-shaped magnet 145 and an upper plate 135 are sequentially mounted on the top surface of a peripheral portion 155a of a yoke 155, such that a magnetic gap is formed between a bent portion of the yoke 155 and the upper plate 135. In this case, the first magnet 145 and the upper plate 135 are bonded to each other by different types of bonding materials that have been diluted, such that the yoke 155, the first magnet 145 and the upper plate 135 are laminated in the order thereof.

The height of the yoke 155 preferably is the same as that of the upper plate 135 bonded to the first magnet 145, which enables the magnetic gap to be effectively formed. A voice coil 125, which is attached to the bottom surface of a vibration plate 115 fixed at the circumferential end thereof to the upper plate 135, is inserted into the magnetic gap formed between the yoke 155 and the first magnet 145. In more detail, the upper plate 135, the first magnet 145 and the yoke 155 constitute a magnetic circuit, and the voice coil 120 is inserted into the magnetic gap formed in the magnetic circuit.

Also, an upper case (not shown in the drawing), which serves to protect the vibration plate 115 and forms a plurality of sound holes through which the sound generated by the upward and downward vibration of the vibration plate 115 is outputted to the outside, may be fixed to the outer circumferential surface outer periphery of the upper plate 135 or a frame 165.

The voice coil 125 which receives a driving signal from portable equipment forms an alternating current rotary magnetic field. As a result, there is generated a force acting upward and downward between the voice coil 125 and the magnetic circuit. Consequently, the vibration plate 115 fixed to one end of the voice coil 125 becomes vibrated upward and downward, thereby generating a dilatational wave which, in turn, produces sounds.

Next, a coin type DC motor 300 is disposed in the lower space of the central portion 155b of the yoke 155 and preferably placed coaxially with the center axis of the yoke 155. The rotor of the coin type DC motor 300 is an eccentric rotor that has different masses between its left and right sides relative to its center. When the eccentric rotor 220 rotates by its eccentricity, it generates vibration. The eccentric rotor 220 is manufactured in such a fashion that a plurality of bundles of coils are disposed, in a unsymmetrical manner with respect to the rotary shaft 210, on the upper portion of the printed circuit board with copper foils formed on the both surfaces thereof.

While the motor part of the speaker according to the first embodiment of the present invention shown in FIGS. 3 and 4 is integrally formed with the speaker part in the form of components, the coin type DC motor 300 of the speaker according to the second embodiment of the present invention shown in FIG. 5 is provided in the form of a finished product. Therefore, the speaker according to the second embodiment of the present invention includes additionally a motor's upper case 310 and a motor's lower case 320 for surrounding the coin type DC motor 300. To this end, the rotary shaft is fixed at one end thereof to the motor's upper case 310 of the coin type DC motor 300, the rotary shaft is fixed at the other end thereof to the motor's lower case 320 of the coin type DC motor 300, the motor's lower case 320 of the coin type DC motor 300 is fixed to the lower plate.

Also, the lower plate 245 may be provided with a hole for exposing the power feed terminal electrically connected to a brush of the coin type DC motor 300 to the outside.

However, it is preferable that the power feed terminal of the coin type DC motor 300 is extended to the same side as the power feed terminal of the voice coil 125 of the speaker coupled thereto such that the connection with the portable equipment is made with ease. Therefore, the following connecting methods may be used: a) the power feed terminal of the voice coil 125 and the power feed terminal of the coin type DC motor 300 are disposed on the lower portion of the lower plate 245; b) in order for the power feed terminal of the coin type DC motor 300 to be extended to the outside of the frame 165 to be formed at the outside, an extending member such as a printed circuit board (PCB) circuit or a conducting wire is disposed on the lower plate 245; and c) the power feed terminal of the coin type DC motor 300 is molded substantially longer than the width of the peripheral portion 155a of the yoke 155 such that it can be extended to the outside of the frame 165. In the preferred embodiment of the present invention, there is described the case where the power feed terminal of the coin type DC motor 300 is extended to the outside of the frame 165, as explained in the above b) and c).

The driving signal applied to the voice coil 125 corresponds to a sound signal like a bell sound for informing a user of an incoming call, and the driving signal applied to the power feed terminal of the coin type DC motor 300 corresponds to a direct current (DC) for generating vibration. In case of folder type portable equipment, on the other hand, the speaker with the built-in DC motor according to the present invention is installed in the folder part, such that it can be used as a receiver. In this case, the driving signal applied to the power feed terminal of the voice coil is the speech signal of a calling party.

The frame 165 is formed on the outer circumferential surfaces of the upper plate 135, the first magnet 145, the yoke 155, and the peripheral portion of the top surface of the lower plate 245 by using an injected material made of a non-magnetic plastic resin. The frame 165 may be formed on the peripheral portion of the top surface of the lower plate 245, and preferably, has a protrusion formed vertically at the upper and lower portions thereof, respectively, in such a manner as to support the upper portion of the upper plate 135 and the lower portion of the lower plate 245. The non-magnetic plastic resin is injected under the pressure in a range of 65 to 75 kg/cm$^2$ at a temperature in the range of 220 to 240° C., thereby forming the frame 165.

The speaker with the built-in DC motor according to the second embodiment of the present invention as constructed above installs the DC motor in the reentrant groove that has been not used in the external magnet type speaker having an outer diameter of 17 phi or more, thus not to cause any increase in the whole space thereof.

Although the speakers with the built-in DC motors according to the preferred embodiments of the present invention have been not shown in the drawings, they may be configured in a shape of a general oval. As the oval speaker is installed easily in the portable equipment, it is widely used at present. The case where the speaker with the built-in DC motor takes the oval shape is as follows: 1) all of the central and peripheral portions of the external magnet type yoke have an oval shape; 2) the external magnet type yoke itself has a generally circular shape but the external housing itself has a generally oval shape. In case of the above 1), all of the first magnet, the upper plate, the vibration plate, the voice coil, and the lower plate that are coupled to the external magnet type yoke are formed in the oval shape. Therefore, the ring shape that is mentioned in the present description and the claims may be interpreted as referring to generally circular and oval ring shapes. Also, the external magnet type yoke may be interpreted as referring to both of the yoke having the oval shape and the yoke having the circular shape.

As described above, a speaker with a built-in coin type DC motor according to the preferred embodiments of the present invention is configured such that a micro speaker is installed in the coin type DC motor for generating vibration therein, thereby selectively generating sound and vibration.

Therefore, the speaker of the present invention decreases the space in the portable equipment occupied by a conventional micro speaker and a coin type vibration motor, thereby achieving the miniaturization of portable equipment. In addition, the speaker of the present invention is capable of maintaining its initial vibration performance for a relatively long period of time, without having an additional driving part.

While this invention has been described in connection with what is presently considered to be the most practical and preferred embodiments, it is to be understood that the invention is not limited to the disclosed embodiments, but is intended to cover various modifications, variations or equivalents within the spirit and scope of the appended claims.

What is claimed is:

1. A speaker with a built-in direct current (DC) motor embedded therein for selectively generating sound and vibration, the speaker comprising:
   a speaker part including;
      a yoke having a hole formed at the center of the bottom thereof,
      a first ring-shaped magnet mounted on the top surface of a peripheral portion of said yoke in such a manner as to be positioned coaxially with the center axis of said yoke,
      a ring-shaped upper plate mounted on the top surface of said first magnet in such a manner as to be positioned coaxially with the center axis of said yoke, and adapted to form a magnetic gap between a bent portion of said yoke and said upper plate to thereby constitute a magnetic circuit for generating magnetic flux together with the yoke and the first ring-shaped magnet,
      a vibration plate attached to the top surface of said upper plate at the circumferential end thereof in such a manner as to be positioned coaxially with the center axis of said yoke, and
      a cylindrical voice coil attached to the bottom surface of said vibration plate and inserted into said magnetic gap,
   a direct current motor part including;
      a lower plate fixedly attached to the bottom surface of said peripheral portion of said yoke,
      a flexible printed circuit board disposed on said lower plate, having a hole formed at the center thereof and a brush transmitting a driving signal,
      a second ring-shaped magnet mounted on the top surface of said lower plate in such a manner as to be positioned coaxially with the center axis of said yoke,
      a rotary shaft one end of which is fitted into said hole of said yoke and the other end of which is fitted into said hole of the center of said flexible printed circuit board, and an eccentric rotor rotatably mounted on said rotary shaft and adapted to rotate in response to the driving signal generated from said brush; and a frame adapted to support said speaker part and said direct current motor part.

2. The speaker according to claim 1, wherein said frame has a flexible printed circuit board mounted on one side thereof, said flexible printed circuit board of said frame having a power feed terminal electrically connected to said voice coil and said brush connected to said eccentric rotor, respectively, and adapted to supply a driving signal to said voice coil to generate sound, and supply a driving signal to said brush to generate vibration due to the rotation of said eccentric rotor.

3. The speaker according to claim 1, wherein said direct current motor part further includes a motor's upper case which has a hole at the center of an inner surface thereof and contains said rotary shaft having an one end thereof fitted into said hole, said rotor and said second magnet; and a motor's lower case which is connected to the bottom of said motor's upper case and has said second magnet thereon, such that said direct current motor is placed in a space defined by the bottom surface and the inner lateral walls of the central portion of said yoke and the top surface of said lower plate.

* * * * *